(12) United States Patent
Prakash et al.

(10) Patent No.: US 8,490,189 B2
(45) Date of Patent: Jul. 16, 2013

(54) USING CHIPSET-BASED PROTECTED FIRMWARE FOR HOST SOFTWARE TAMPER DETECTION AND PROTECTION

(75) Inventors: Gyan Prakash, Beaverton, OR (US); Saurabh Dadu, Tigard, OR (US); Hormuzd M. Khosravi, Portland, OR (US); Mousumi M. Hazra, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 956 days.

(21) Appl. No.: 12/586,705

(22) Filed: Sep. 25, 2009

(65) Prior Publication Data

US 2011/0078791 A1 Mar. 31, 2011

(51) Int. Cl.
*H04L 29/00* (2006.01)
(52) U.S. Cl.
USPC .......... 726/22; 726/20; 726/23; 726/24; 726/25; 713/153; 713/182; 713/188
(58) Field of Classification Search
USPC .......... 726/22, 26; 713/2, 189; 707/E17.01
See application file for complete search history.

(56) References Cited

U.S. PATENT DOCUMENTS

| | | | |
|---|---|---|---|
| 7,523,499 B2* | 4/2009 | Wilkins et al. | 726/23 |
| 2006/0200672 A1* | 9/2006 | Calhoon et al. | 713/176 |
| 2009/0031425 A1* | 1/2009 | Basson et al. | 726/26 |
| 2010/0100962 A1* | 4/2010 | Boren | 726/25 |

OTHER PUBLICATIONS

"IC Identification Circuit Using Device Mismatch"; Lofstrom et al, Proc. of ISSCC 2000, pp. 372-373, Feb. 2000 Copyright IEEE 2000.*
"Efficient Memory Integrity Verification and Encryption for Secure Processors"; Suh et al; Microarchitecture, 2003. MICRO-36. Proceedings. 36th Annual IEEE/ACM International Symposium on Dec. 3-5, 2003 pp. 339-350; Copyright IEEE 2003.*
"Convergence Analysis of Chip- and Fractionally Spaced LMS Adaptive Multiuser CDMA Detectors"; Lim et al; IEEE Transactions on Signal Processing, vol. 48, No. 8, Aug. 2000, 10 pages.*

* cited by examiner

*Primary Examiner* — Taghi Arani
*Assistant Examiner* — Jason Lee
(74) *Attorney, Agent, or Firm* — D'Ann Naylor Rifai (57) ABSTRACT

A method, system, and computer program product for a host software tamper detection and protection service. A secure partition that is isolated from a host operating system of the host system, which may be implemented by firmware of a chipset of the host system, obtains file metadata from the host system and uses the file metadata to identify a first file for examination for tampering. The secure partition obtains data blocks for the first file, communicates with a service via an out-of-band communication channel, and uses information obtained from the service and the data blocks to determine whether the first file has been corrupted. The secure partition obtains the file metadata and the data blocks for the first file without invoking an operating system or file system of the host system.

24 Claims, 6 Drawing Sheets

USING CHIPSET-BASED PROTECTED FIRMWARE FOR HOST SOFTWARE TAMPER DETECTION AND PROTECTION

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

TECHNICAL FIELD

The present disclosure relates generally to protection of host software from tampering.

BACKGROUND

Malware is software that the owner/user of the computer system does not install himself. Malware typically enters the computer system without the knowledge of the user—generally via the network interface and sometimes through software or other digital data stored on removable media such as a CD-ROM or USB pen-drive. The intent of malicious software is to damage the user's system by deleting important data or deleting important operating system and application executable files rendering the infected system unable to operate. If user data (such as photos, emails, documents) are deleted and the user does not have a backup of the lost data, that user data may never be recovered. If operating system or application files are deleted, the system may be recovered by re-installing the damaged or deleted software. In either case, malware causes significant damage in terms of loss of productivity as well as user data. Malware is becoming more dangerous in that the software may not noticeably damage the system but rather may remain hidden (deleting important files would immediately alert the user to the presence of the malware), attempting to steal important information such as credit card numbers, usernames and passwords, and so on.

Malware typically enters the system via the internet (i.e., via the network interface). Upon entering the system, malware first attempts to become 'resident' on the system by writing a copy of malware system files to the secondary storage or hard disk drive of the system. Once a copy is made in persistent storage, the malicious software remains on the computer system until the malicious software is found and deleted (which is what most anti-virus software does). However, becoming persistent on the platform does not guarantee that the malicious software will be activated (or loaded) if the computer is rebooted. To ensure boot-time activation in addition to becoming persistent, the malicious software inserts commands into the startup (or boot) sequence of the computer. Once this is successfully accomplished, the malicious software is re-activated every time the computer is switched on, surviving reboots/power-cycles.

Malware 'hook' into the boot sequence of the system by modifying or 'attaching' malware software files and/or commands to operating system executable files that are always loaded and activated during the OS boot process. An alternative, frequently used technique is for malware to modify system configuration files that control the boot processes by listing the malware files as 'legitimate' system files to be loaded at boot time. Once these operating system executable files and/or system configuration files are corrupted, malware can establish an environment in which protections normally provided by the operating system are circumvented.

Present attempts to address malware have included using a host operating system-based shadow program to monitor critical software drivers and applications such that if the critical drivers or applications are corrupted, then the shadow program will detect the integrity failure and start the repairing or re-installing the software as needed. However, because the host operating system is itself often the target of malware, these shadow programs can be disabled as well.

Another attempt to address malware is to use an Extensible Firmware Interface (EFI) driver to monitor and/or restore critical software drivers and applications prior to loading the host operating system. However, because an EFI driver runs only at system boot time, this solution does not address problems that arise after malware has corrupted system files and before the system is rebooted.

Currently available Tamper Resistance Software (TRS) performs integrity checks of critical software components. However, most of these integrity checks are also performed using functionality of the host operating system and are thus subject to malware attacks as well.

DETAILED DESCRIPTION

Embodiments of the present invention may provide a method, apparatus, system, and computer program product for a host software tamper detection and protection service. In one embodiment, the host software tamper detection and protection service is provided within a secure partition that provides an isolated environment, remote from, and inaccessible by, the host operating system. Thus the host software tamper detection and protection service functionality is protected from the types of attacks that may be levied on the host operating system by malware. Reference in the specification to "one embodiment" or "an embodiment" of the present invention means that a particular feature, structure or characteristic described in connection with the embodiment is included in at least one embodiment of the invention. Thus, the appearances of the phrases "in one embodiment," "according to one embodiment" or the like appearing in various places throughout the specification are not necessarily all referring to the same embodiment.

In one embodiment, a secure partition of a host system obtains file metadata for a plurality of files stored on a device coupled to the host system and uses the file metadata to identify a first file for examination for tampering. The secure partition obtains data blocks for the first file, communicates with a service via an out-of-band communication channel, and uses information obtained from the service and the data blocks to determine whether the first file has been corrupted. The secure partition obtains the file metadata and the data blocks for the first file without invoking an operating system or file system of the host system. In one embodiment, the secure partition is provided by chipset firmware.

In one embodiment, the out-of-band communication channel is a secure communication channel between the secure partition of the host system and an enterprise service that manages the host system as one of a plurality of managed host systems. The out-of-band communication channel is isolated from, and inaccessible by, the host operating system. Obtaining the file metadata may be performed in response to a first request from the service, and obtaining the data blocks may be performed in response to a second request from the service. If the first file is determined to be corrupted, the secure partition may receive a verified version of the first file from the service via the out-of-band communication channel and cause the first file to be replaced on the host system with the verified version of the first file.

In one embodiment, a reconstructed version of the first file is constructed from the data blocks, and the determination whether the first file is corrupted is made using the reconstructed version of the first file. The construction of the reconstructed version of the first file may be performed by a tamper protection module of the secure partition, or the construction and the determination may be performed by the service after receiving the data blocks via the out-of-band communication channel.

In one embodiment, the information obtained from the service comprises a signature for the first file. Determining whether the first file has been corrupted comprises calculating a second signature from the data blocks for the first file and comparing the second signature to the signature for the first file. In one embodiment, after making a determination that the first file has been corrupted, the functionality of the host system is restricted.

By using a secure partition to perform software integrity checks, the host software tamper detection and protection service described herein is capable of operating independently from the host operating system. Furthermore, by communicating via a secure out-of-band communication channel with a tamper detection and protection service, the secure partition can use technologies such as 3G, WiMax and SMS to inform the original software provider about tampering and to restore the original software program and/or take other preventive measures if corruption is found. The host software tamper detection and protection service is also independent of the storage/disk device type and can be configured to interoperate with various storage technologies and buses (including SATA, IDE, USB, PCI-e, etc.).

The isolated and secure environment of the tamper detection and protection service may comprise a variety of different types of partitions, including an entirely separate hardware partition (e.g., utilizing Intel® Corporation's Manageability Engine ("ME"), Active Management Technologies ("AMT"), Platform Resource Layer ("PRL") and/or other comparable or similar technologies) and/or a virtualized partition (e.g., a virtual machine in Intel® Corporation's Virtualization Technology ("VT") scheme). It will be apparent to those of ordinary skill in the art that a virtualized host may also be used to implement ME, AMT and PRL technologies (as described in further detail below with reference to FIG. 6.)

Figure 1:
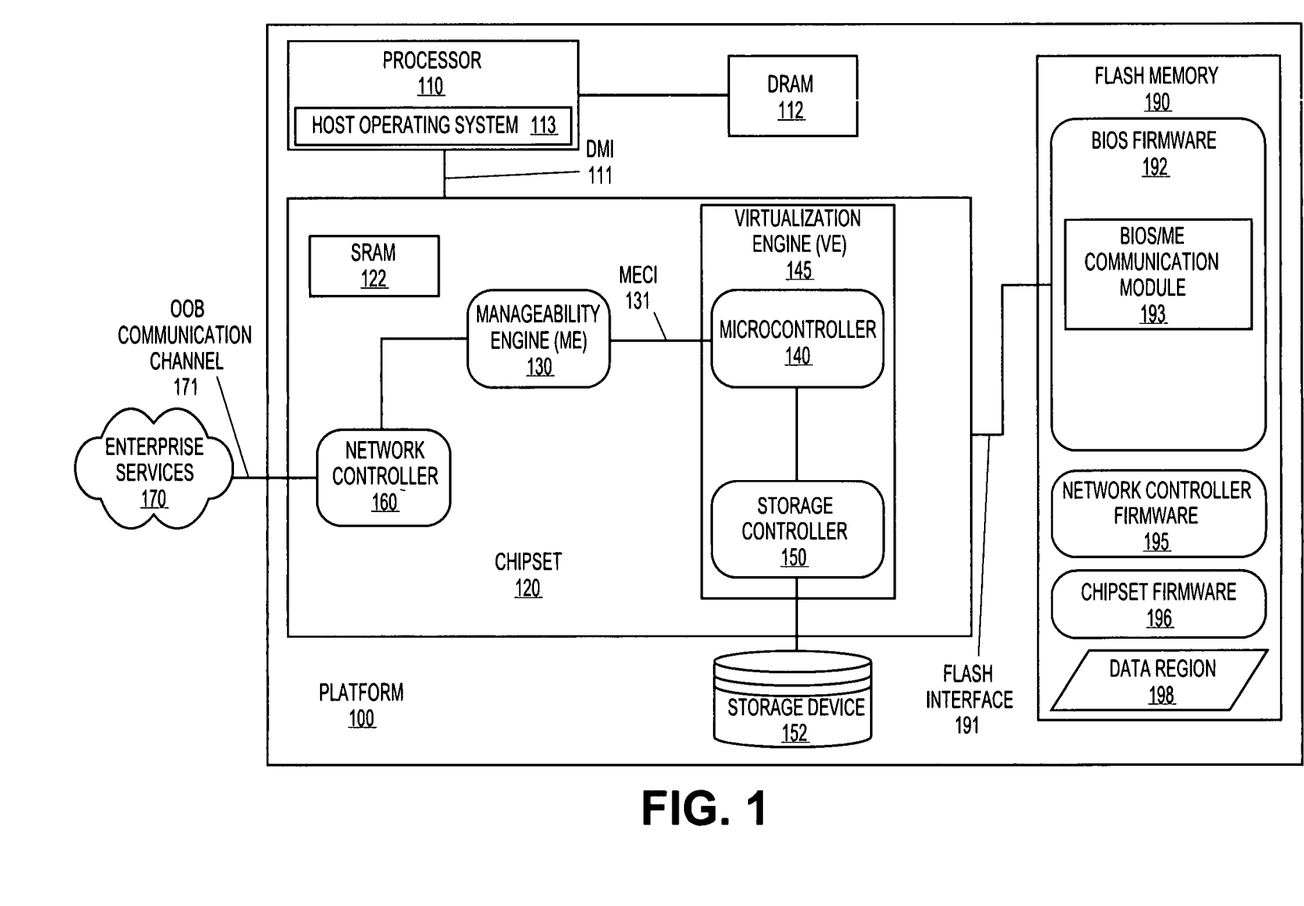
FIG. 1 is a block diagram of a system configured to use a host software tamper detection and protection service in accordance with one embodiment of the invention.

FIG. 1 is a block diagram of a processing system configured to be protected using a host software tamper detection and protection service in accordance with one embodiment of the invention. Platform 100, which corresponds to a host computer system, includes a processor 110 connected to a chipset 120 via a desktop management interface (DMI) 111. Processor 110 provides processing power to platform 100 and may be a single-core or multi-core processor, and more than one processor may be included in platform 100. Processor 110 may be connected to other components of platform 100 via one or more system buses, communication pathways or mediums (not shown).

Chipset 120 includes a manageability engine (ME) 130, which may be implemented as an embedded microprocessor that operates independently of host processor 110, to manage the configuration and operation of platform 100. In one embodiment, processor 110 operates under the direction of host operating system 113, whereas manageability engine (ME) 130 provides a secure and isolated environment that cannot be accessed by host operating system 113. In one embodiment, manageability engine (ME) 130 authenticates users, controls access to peripheral devices, manages encryption keys for protection of data stored on storage devices of platform 100, and provides an interface to enterprise services 170 via network controller 160. Using enterprise services 170, manageability engine (ME) 130 maintains consistency with enterprise-wide policies for configuration and management of platforms such as platform 100, including providing a service for host software tamper detection and protection in accordance with one embodiment of the invention. A host software tamper detection and protection service may be implemented as firmware executed by manageability engine (ME 130).

Communication between ME 130 and enterprise services 170 occurs via out-of-band communication channel 171. In one embodiment, out-of-band communication channel 171 is a secure communication channel between the manageability engine (ME) 130 on the host system and enterprise services 170 that manages the host system.

In the embodiment shown in FIG. 1, manageability engine (ME) 130 is coupled to a virtualization engine 145 via a Manageability Engine Controller Interface (MECI) 131. Virtualization engine 145 provides access to storage devices, although it is not necessary to the invention that a virtualization engine is present if ME 130 has a direct mechanism for communicating with storage devices. In the embodiment shown, virtualization engine 145 is made up of microcontroller 140 and storage controller 150. In one embodiment, microcontroller 140 is a general-purpose controller that performs storage command decoding and other accelerated operations. In the embodiment shown, manageability engine (ME) 130 controls the behavior of microcontroller 140, which in turn controls the behavior of storage controller 150. Virtualization engine 145 includes drivers for storage controller 150 as well as the logic related to any disk encryption functionality. Storage controller 150 is the controller for storage devices such as storage device 152 and enables virtualization engine 145 and ME 130 to access blocks of data stored on storage device 152.

Platform 100 further includes memory devices such as dynamic random access memory (DRAM) 112, static random access memory (SRAM) 122 within chipset 120, and flash memory 190, as well as storage device 152 accessible via storage controller 150. These memory devices may include random access memory (RAM) and read-only memory (ROM). For purposes of this disclosure, the term "ROM" may be used in general to refer to non-volatile memory devices such as erasable programmable ROM (EPROM), electrically erasable programmable ROM (EEPROM), flash ROM, flash memory, etc. Storage device 152 may include mass storage devices such as integrated drive electronics (IDE) hard drives, and/or other devices or media, such as floppy disks, optical storage, tapes, flash memory, memory sticks, digital video disks, biological storage, etc.

Flash memory 190 is accessible by chipset 120 via flash interface 191. Data stored on storage device 152 and/or in memory devices DRAM 112, SRAM 122, and flash memory 190 may be encrypted.

Flash memory 190 contains firmware used to initialize platform 100. This initialization firmware includes Basic Input/Output System (BIOS) firmware 192 to identify and initialize system component hardware (such as the video display card and hard disk) and some other hardware devices including manageability engine (ME) 130. BIOS firmware 192 prepares system component hardware of platform 100 to operate in a known low capability state, so other software programs stored on various media, including an operating system, can be loaded, executed, and given control of platform 100. BIOS firmware 192 includes BIOS/ME communication module 193, which enables the initial configuration of manageability engine (ME) 130 during the boot process. In one embodiment, manageability engine (ME) 130 registers with BIOS/ME communication module 193 to receive a notification just before an operating system is loaded for platform 100. This notification enables manageability engine (ME) 130 to perform certain instructions in preparation for the operating system being loaded.

Flash memory 190 also includes network controller firmware 195 to configure network controller 160, and chipset firmware 196 to configure chipset 120. Flash memory 190 also contains a data region 198. In one embodiment, data region 198 is encrypted and may only be read by manageability engine (ME) 130. Information used by ME 130 to provide host software tamper detection and protection services may be stored in data region 198 of flash memory 190 or on storage device 152.

Processor 110 may also be communicatively coupled to additional components, such as video controllers, small computer system interface (SCSI) controllers, network controllers, universal serial bus (USB) controllers, input devices such as a keyboard and mouse, etc. Platform 100 may also include one or more bridges or hubs, such as a memory controller hub, an input/output (I/O) controller hub, a PCI root bridge, etc., for communicatively coupling various system components. As used herein, the term "bus" may be used to refer to shared communication pathways, as well as point-to-point pathways.

Some components, such as network controller 160 for example, may be implemented as adapter cards with interfaces (e.g., a PCI connector) for communicating with a bus. In one embodiment, one or more devices may be implemented as embedded controllers, using components such as programmable or non-programmable logic devices or arrays, application-specific integrated circuits (ASICs), embedded computers, smart cards, and the like.

As used herein, the terms "processing system" and "data processing system" are intended to broadly encompass a single machine, or a system of communicatively coupled machines or devices operating together. Example processing systems include, without limitation, distributed computing systems, supercomputers, high-performance computing systems, computing clusters, mainframe computers, mini-computers, client-server systems, personal computers, workstations, servers, portable computers, laptop computers, tablets, telephones, personal digital assistants (PDAs), handheld devices, entertainment devices such as audio and/or video devices, and other devices for processing or transmitting information.

Platform 100 may be controlled, at least in part, by input from conventional input devices, such as keyboards, mice, etc., and/or by commands received from another machine, biometric feedback, or other input sources or signals. Platform 100 may utilize one or more connections to one or more remote data processing systems (not shown), such as through a network interface controller (NIC) 160, a modem, or other communication ports or couplings.

Platform 100 may be interconnected to other processing systems (not shown) by way of a physical and/or logical network, such as a local area network (LAN), a wide area network (WAN), an intranet, the Internet, etc. Communications involving a network may utilize various wired and/or wireless short range or long range carriers and protocols, including radio frequency (RF), satellite, microwave, Institute of Electrical and Electronics Engineers (IEEE)802.11, Bluetooth, optical, infrared, cable, laser, etc.

Figure 2:
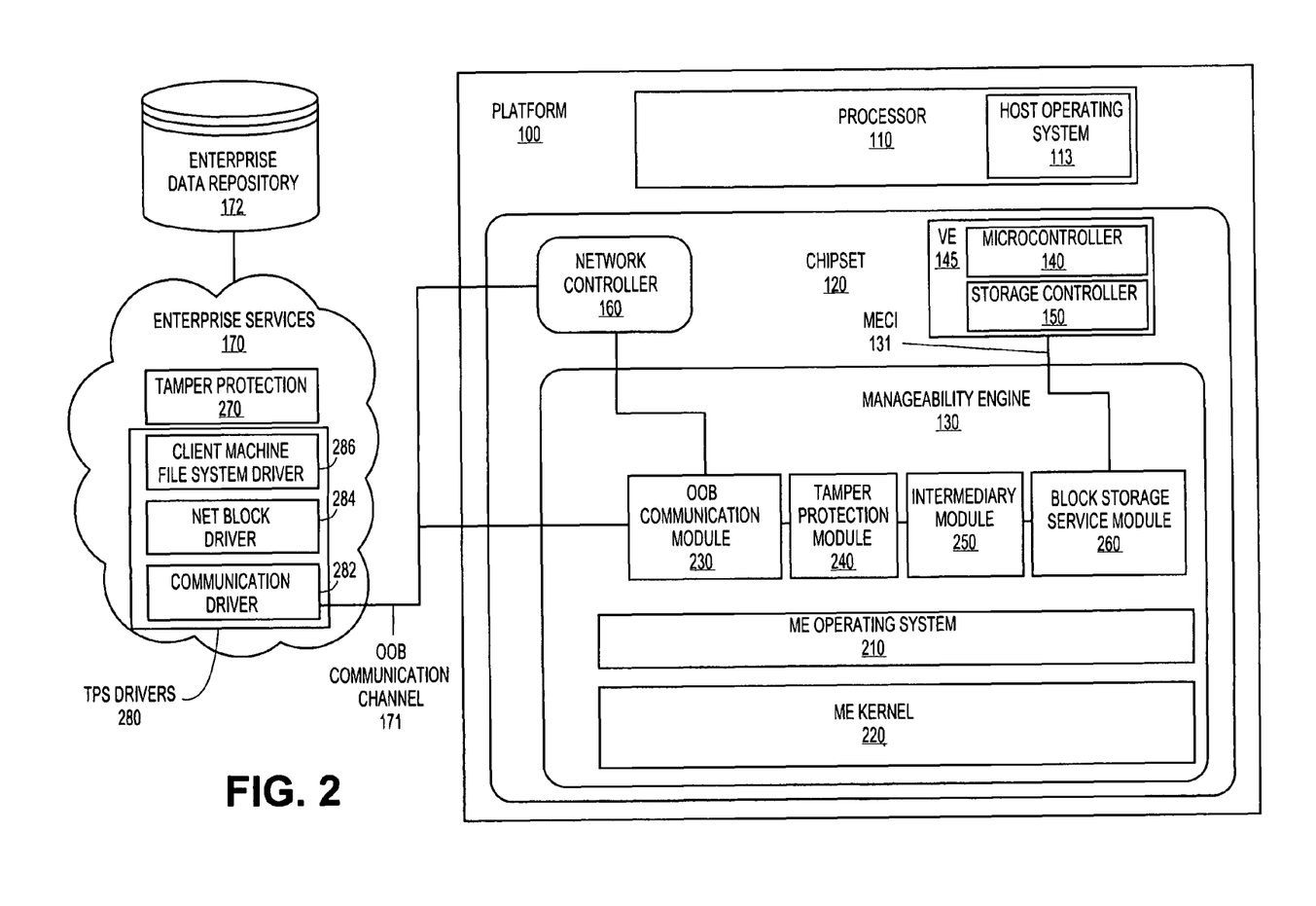
FIG. 2 shows further details of the system of FIG. 1 in enabling a host software tamper detection and protection service in accordance with one embodiment of the invention.

FIG. 2 shows further details of the processor 110, manageability engine (ME) 130, and enterprise services 170 of FIG. 1 in enabling a host software tamper detection and protection service in accordance with one embodiment of the present invention. ME 130 includes logic for accessing files on platform 100 and communicates with tamper protection services 270 of enterprise services 170 via out-of-band communication channel 171.

Within chipset 120, manageability engine 130 is shown after chipset firmware 196 of FIG. 1 has been loaded. Manageability engine 130 includes ME operating system 210 and ME kernel 220, which provide basic operational capabilities to manageability engine 130. Manageability engine 130 also includes out-of-band (OOB) server communication module 230, a tamper protection module 240, an intermediary module 250, and a block storage service 260. OOB server communication module 230 facilitates communication between tamper protection components of platform 100 with tamper protection components of enterprise services 170 via network controller 160. In one embodiment, out-of-band communication channel 171 is used to transfer file metadata, data blocks, and other tamper detection and protection information. Out-of-band communication channel 171 is maintained as a secure communication channel with secure authentication keys being used to establish communication between OOB server communication module 230 and enterprise services 170.

Tamper protection module 240 interacts with tamper protection services 270 of enterprise services 170 to detect tampering with software installed on platform 100 and restore software that has been corrupted to an uncorrupted, verified version. While tamper protection services 240 is shown within manageability engine 130 as part of chipset firmware, tamper protection services 240 may be separate firmware running on, for example, microcontroller 140 that has an interface with manageability engine 130.

Intermediary module 250 enables communication between OOB communication module 230 and block storage service 260. Intermediary module 250 may provide instructions to perform data recovery and/or data overwriting operations to block storage service 260.

Block storage service 260 reads and writes blocks of data from storage device 152 via virtualization engine 145 storage controller 150. Block storage service 260 provides the data blocks to manageability engine (ME) 130 via MECI interface 131.

Enterprise services 170 is shown as including tamper protection services 270 and TPS drivers 280. In the embodiment shown, enterprise services 170 have an enterprise data repository 172 to store information such as versions of software installed on the host system, encryption keys, and other data used by tamper protection services 270 and TPS drivers 280.

In one embodiment, tamper protection services 270 is a service provided by a mobile platform service provider, and tamper protection module 240 is configured to provide information about files stored on host systems, which are mobile devices, to the mobile platform service provider's service. A user may enroll his or her host system with tamper protection services 270 and identify critical system files or applications to be protected. Information about software on the host system may be stored in enterprise data repository 172, as well as in data region 198 of flash memory 190 or in storage device 152.

In response to a determination that files on the host computer system have been subject to tampering, tamper protection services 270 may send an instruction to the host computer system to restrict functionality of the host computer system. For example, tamper protection services 270 may provide an instruction to reconfigure platform 100 so that all functionality is disabled, prevent the operating system from loading, or enable the operating system to be loaded but restrict other functions that can be performed after the operating system is loaded. In response to such an instruction from tamper protection services 270, tamper protection module 240 may perform actions to address the tampering in accordance with the instruction received. These actions may include disabling processor 110 or parts of chipset 120, disallowing access to flash memory 190, reconfiguring BIOS firmware 192, reconfiguring other portions of manageability engine (ME) 130, or re-installing software on the host system in accordance with the instruction.

In the case where a host system hard drive is encrypted, tamper protection service 270 may interact with other encryption or IT servers to obtain a disk decryption key for the host system on which the tamper protection service is being provided. Alternatively, the service vendor providing the tamper protection service 270 may also provide theft management and/or disk encryption services and may maintain the disk encryption keys as part of enterprise data repository 172.

TPS drivers 280 are used by tamper protection service 270 to interpret information received from tamper protection service 240 of manageability engine (ME) 130 on platform 100. TPS drivers 280 include communication driver 282, net block driver 284, and client machine file system driver 286. Communication driver 282 is used to communicate with platform 100 via OOB communication channel 171, network controller 160 of chipset 120, and OOB communication module 230 within manageability engine 130. In addition, communication driver 282 communicates remotely with manageability engine 130 on platform 100 to fetch data blocks over out-of-band communication channel 171 on demand. Data may be communicated over out-of-band communication channel 171 to communication driver 282 using an appropriate data protocol, such as FTP, 3G wireless, WiMax, or UDP. Under an FTP/TCP protocol, communication driver 282 may act as an FTP client and OOB communication driver 230 of ME 130 may act as an FTP server. This configuration can be used for 3G wireless, WiMax and other transport mechanisms. Under an SMS protocol, communication driver 282 may configure out-of-band communication channel 171 as an SMS based communication channel. Under a UDP protocol, communication driver 282 may configure out-of-band communication channel 171 as a UDP-based lightweight channel.

Net Block driver 284 provides a standard disk block interface to the operating system of the system on which tamper protection services 270 is running. Net block driver 284 organizes the disk blocks obtained from the host system, platform 100, and presents the storage device interface to client machine file system driver 286.

Client machine file system driver 286 is used to emulate a file system for the host system, platform 100, to interpret data blocks received over out-of-band communication channel 171 from manageability engine (ME) 130 and determine the files to which the data blocks correspond. In one embodiment, client machine file system driver 286 is part of the operating system kernel on the server system hosting tamper protection service 270. In another embodiment, client machine file system driver 286 is implemented as an application-level driver.

Figure 3:
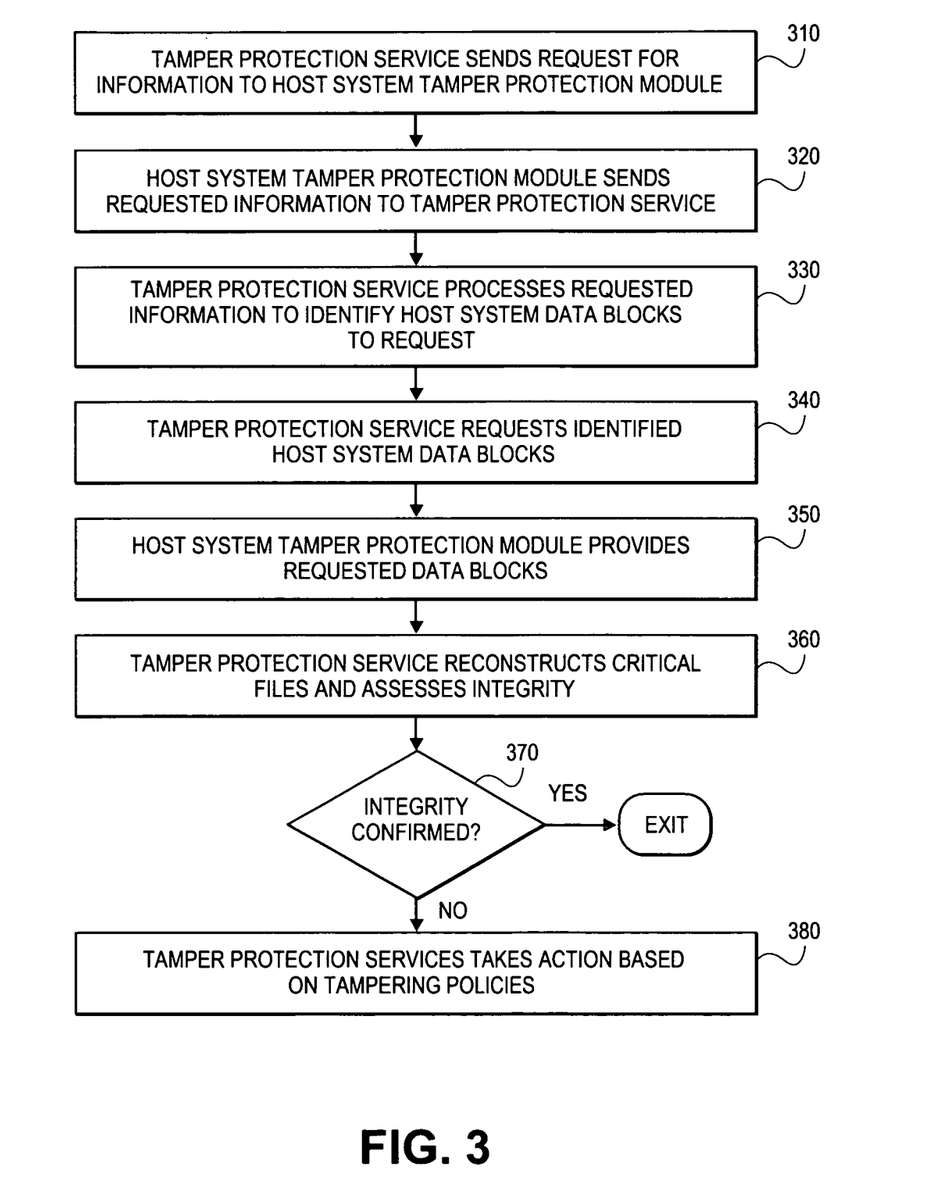
FIG. 3 is a flowchart of a method to remotely detect and protect against host software tampering in accordance with one embodiment of the invention.

FIG. 3 is a flowchart of a method to remotely detect and protect against host software tampering in accordance with one embodiment of the invention. FIG. 3 will be described as being performed by tamper protection services 270 of FIG. 2 in conjunction with manageability engine (ME) 130 and its components such as tamper protection module 240.

At "Tamper Protection Service Sends Request for Information to Host System Tamper Protection Module" step 310, tamper protection services 270 sends a request for information to the host system tamper protection module 240 via out-of-band communication channel 171. The request may specify particular information such as metadata related to critical system files to be protected from tampering. For example, the request may specify metadata for a MBR (Master Boot Record), boot sector, and/or certain MFT (Master File Table) entries. This metadata may be used, for example, to identify a file system that is being used by the host system, as the file system is typically identified in the boot sector. Once the file system being used by the host system is identified, tamper protection services 270 can load an appropriate client machine file system driver 286 to process data blocks for files under the appropriate file system. The client machine file system may be different from the file system used on the system hosting tamper protection service 270, and therefore a separate client machine file system driver 286 is used to emulate the host system's file system.

At "Host System Tamper Protection Module Sends Requested Information to Tamper Protection Service" step 320, manageability engine (ME) 130 component tamper protection service 240 uses intermediary module 250 and block storage service 260 to request data blocks from storage device 152 via virtualization engine 145 storage controller 150. The requested data blocks are sent by OOB communication module 230 to tamper protection services 270 via out-of-band communication channel 171.

At "Tamper Protection Service Processes Requested Information to Identify Host System Data Blocks to Request" step 330, tamper protection service 270 parses the information received to determine which host system data blocks correspond to the critical software files to be checked for tampering.

At "Tamper Protection Service Requests Identified Host System Data Blocks" step 340, tamper protection service 270 sends a command to tamper protection module 240 of manageability engine 130 to retrieve particular data blocks corresponding to the software files to be examined for tampering.

At "Host System Tamper Protection Module Provides Requested Data Blocks" step 350, manageability engine (ME) 130 component tamper protection service 240 again uses intermediary module 250 and block storage service 260 to request data blocks from storage device 152 via virtualization engine 145 storage controller 150. The requested data blocks are sent by OOB communication module 230 to tamper protection services 270 via out-of-band communication channel 171.

At "Tamper Protection Service Reconstructs Critical Files and Assesses Integrity" step 360, tamper protection service 270 reconstructs on the server side the critical software files from the data blocks provided from the host system. This reconstruction process requires using an appropriate client machine file system driver 286 to emulate the host file system environment on the server side. Tamper protection services 270 may calculate a signature or checksum on the reconstructed files and compare the result with verified signatures or checksums for the original software files. In one embodiment, the software signature or the checksum must be signed by a private key that manageability engine 130 can verify. This private key may be stored, for example, in flash memory 190 data region 198.

At "Integrity Confirmed?" decision point 370, if the calculated signature or checksum for a file matches the verified signature or checksum for the original software file, then the integrity of the file has been confirmed and processing ends. However, if at "Integrity Confirmed" decision point 370, the calculated signature or checksum for a file does not match the verified signature or checksum for the original software file, then control proceeds to "Tamper Protection Service Takes Action Based on Tampering Policies" step 380.

At "Tamper Protection Service Takes Action Based on Tampering Policies" step 380, tamper protection services 270 addresses the tampering in accordance with policies established by the enterprise for handling host software tampering. The action may include providing a verified version of the file found to have been corrupted to the host system via out-of-band communication channel 171. If the file is seriously corrupted or if multiple corrupted files have been discovered, the action may include sending an instruction to the host system to restrict functionality of the host system. Restricting functionality of the host system may include completely disabling the host system.

Figure 4:
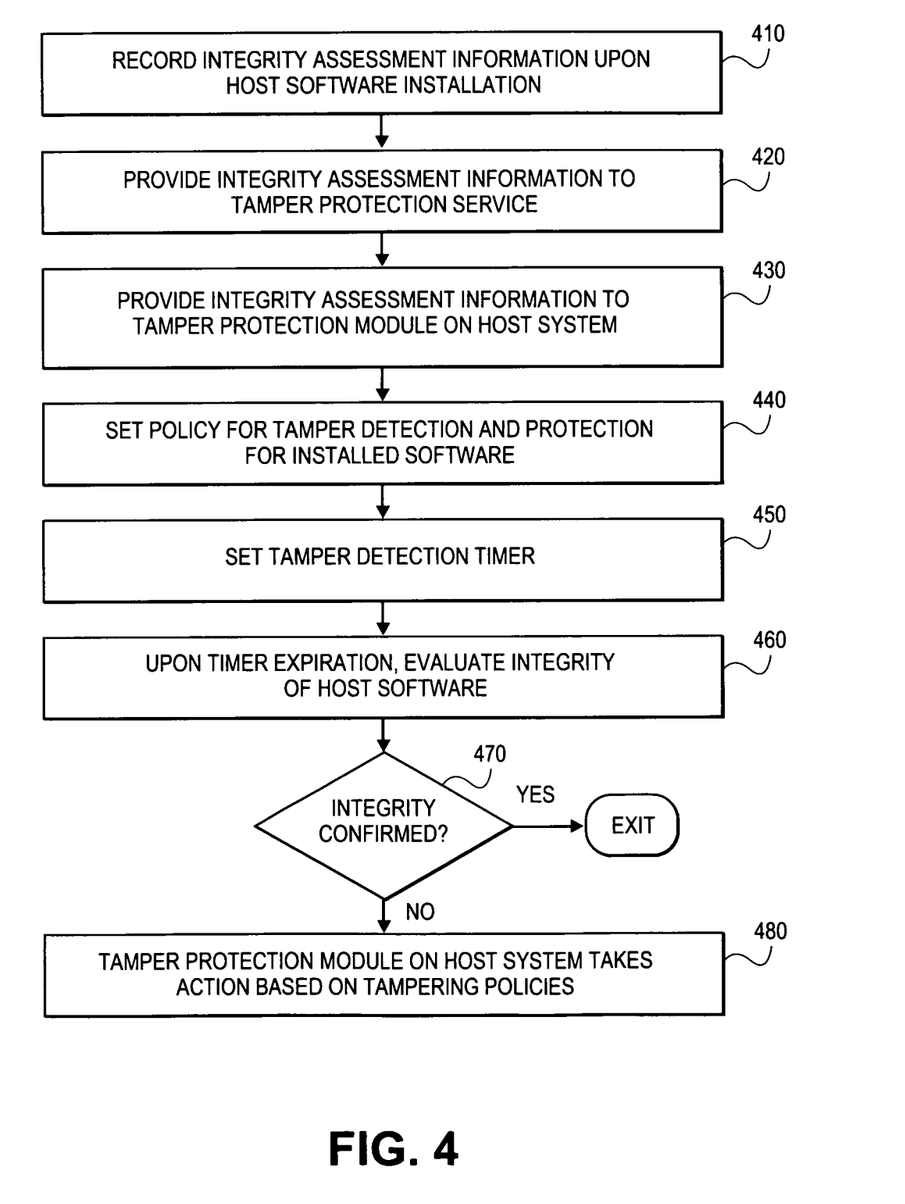
FIG. 4 is a flowchart of a method to configure and operate a host system for detection and protection against tampering in accordance with one embodiment of the invention.

FIG. 4 is a flowchart of a method to configure and operate a host system for detection and protection against tampering in accordance with one embodiment of the invention. At "Record Integrity Assessment Information upon Host Software Installation" step 410, as software is installed on a host system, information to assess the integrity of the software is recorded. This information may be recorded by a software installer; for example, in an environment where software is initially downloaded from a website, a program may also be downloaded that records the integrity assessment information as the installation takes place. Alternatively, manageability engine (ME) 130 may be configured to receive integrity assessment information from the installer and record this information after software is installed on the host system. Information for assessing the integrity of the software installation may include data blocks where critical files are stored as well as signatures or checksums for the critical files.

At "Provide Integrity Assessment Information to Tamper Protection Service" step 420, the integrity assessment information recorded at "Record Integrity Assessment Information upon Host Software Installation" step 410 is provided to tamper protection services 270. This information may be provided to tamper protection service 270 by the entity that recorded the integrity assessment information; e.g., by a software installer or by manageability engine (ME) 130. Preferably, this information is provided over a secure network connection such as out-of-band communication channel 171.

At "Provide Integrity Assessment Information to Tamper Protection Module on Host System" step 430, if tamper protection module 240 has not already been provided with the integrity assessment information for the newly-installed software files, tamper protection service 270 sends information about the disk block addresses and the signature of the software files via out-of-band communication channel 171 to tamper protection module 240. Because out-of-band communication channel 171 is secure, tamper protection module 240 trusts the information coming from tamper protection services 270. In one embodiment, the integrity assessment information is stored in a secure area such as data region 198 of flash memory 190 on platform 100.

At "Set Policy for Tamper Detection and Protection for Installed Software" step 440, tamper protection services 270 establishes the policies for actions to be taken when tampering is detected with the software files just installed.

At "Set Tamper Detection Timer" step 450, tamper protection services 270 sets a timer for examining the host software for tampering. This timer runs within manageability engine (ME) 130.

At "Upon Timer Expiration, Evaluate Integrity of Host Software" step 460, when the timer expires, tamper protection module 240 uses intermediary module 250 and block storage service 260 to request the data blocks mapped to the software files. Virtualization engine 145 reads the disk blocks and sends the data to tamper protection module 240. Tamper protection module 240 computes the signature of the files and verifies the integrity with the signatures provided in "Provide Integrity Assessment Information to Tamper Protection Module on Host System" step 430. As mentioned earlier, in one embodiment, the integrity assessment information was stored in data region 198 of flash memory 190.

At "Integrity Confirmed?" decision point 470, if the calculated signature or checksum for a file matches the verified signature or checksum for the original software file, then the integrity of the file has been confirmed and tamper protection module 240 can reset the tamper detection timer. However, if at "Integrity Confirmed" decision point 470, the calculated signature or checksum for a file does not match the verified signature or checksum for the original software file, then control proceeds to "Tamper Protection Host Module Takes Action Based on Tampering Policies" step 480.

At "Tamper Protection Host Module Takes Action Based on Tampering Policies" step 380, tamper protection module 240 addresses the tampering in accordance with policies established by the enterprise for handling host software tampering. The action may include obtaining a verified version of the file found to have been corrupted from tamper protection services 270 via out-of-band communication channel 171. If the file is seriously corrupted or if multiple corrupted files have been discovered, the action may include notifying tamper protection services 270. In response, tamper protection services 270 may send an instruction to the host system to restrict functionality of the host system. Restricting functionality of the host system may include completely disabling the host system.

Figure 5:
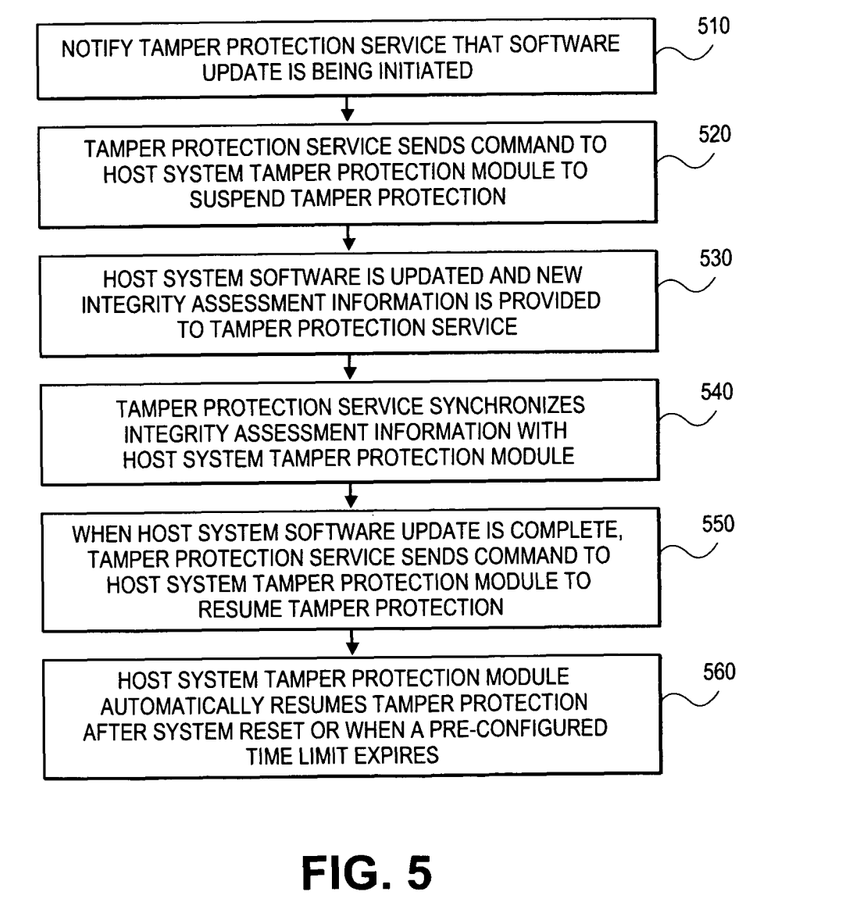
FIG. 5 is a flowchart of a method for updating host system software protected by a tamper protection service in accordance with one embodiment of the invention.

FIG. 5 is a flowchart of a method for updating host system software protected by a tamper protection service in accordance with one embodiment of the invention. At "Notify Tamper Protection Service that Software Update is being Initiated" step 510, the software program installing the update notifies tamper protection service 270 that a host system software update is being initiated. At "Tamper Protection Service Sends Command to Host System Tamper Protection Module to Suspend Tamper Protection" step 520, tamper protection service 270 sends a command via out-of-band communication channel 171 to the tamper protection module 240 to suspend tamper protection to ensure that tamper protection module 240 does not interfere with the update process. At "Host System Software is Updated and New Integrity Assessment Information is Provided to Tamper Protection Service" step 530, the software update installation program applies the patch to the files which are being updated and sends the new signatures and disk block information to the tamper protection service 270. At "Tamper Protection Service Synchronizes Integrity Assessment Information with Host System Tamper Protection Module" step 540, tamper protection service 270 modifies the corresponding signatures and disk block information in the manageability engine 130 by sending commands to manageability engine 130. At "When Host System Software Update is Complete, Tamper Protection Service Sends Command to Host System Tamper Protection Module to Resume Tamper Protection" step 550, once the software program installing the update has finished updating the host system software, the installation program informs tamper protection service 270 that the update process is completed. Tamper protection service 270 sends a command to host system tamper protection module 240 to resume tamper protection. "Host System Tamper Protection Module Automatically Resumes Tamper Protection after System Reset or when a Pre-configured Time Limit Expires" step 560 is used to protect the host system in a situation where the "resume tamper protection" command has been blocked by malware from reaching the host system tamper protection module. Host system tamper protection module 240 will automatically resume tamper protection after a system reset or when a pre-configured time limit has expired.

Figure 6:
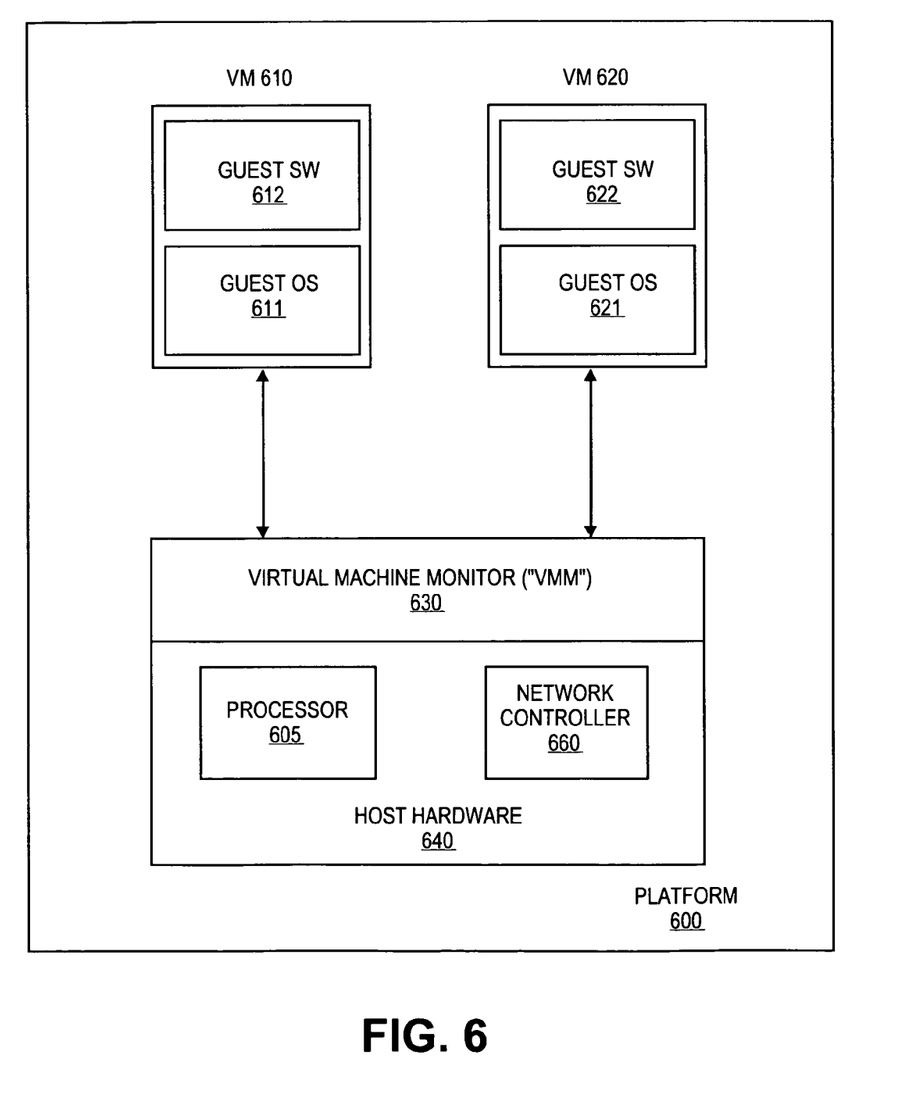
FIG. 6 shows a virtual machine environment for implementing a host software tamper detection and protection service in accordance with one embodiment of the invention.

FIG. 6 shows a virtual machine environment for implementing a host software tamper detection and protection service in accordance with one embodiment of the invention. If platform 100 is virtualized, it may include only a single processor but a virtual machine monitor ("VMM 630") on the host may present multiple abstractions and/or views of the host, such that the underlying hardware of the host appears as one or more independently operating virtual machines ("VMs"). VMM 630 may be implemented in software (e.g., as a standalone program and/or a component of a host operating system), hardware, firmware and/or any combination thereof. VMM 630 manages allocation of resources on the host and performs context switching as necessary to cycle between various VMs according to a round-robin or other predetermined scheme. It will be readily apparent to those of ordinary skill in the art that although only one processor is illustrated ("Processor 605"), embodiments of the present invention are not so limited and multiple processors may also be utilized within a virtualized environment.

Although only two VM partitions are illustrated ("VM 610" and "VM 620", hereafter referred to collectively as "VMs"), these VMs are merely illustrative and additional virtual machines may be added to the host. VM 610 and VM 620 may function as self-contained platforms respectively, running their own "guest operating systems" (i.e., operating systems hosted by VMM 630, illustrated as "Guest OS 611" and "Guest OS 621" and hereafter referred to collectively as "Guest OS") and other software (illustrated as "Guest Software 612" and "Guest Software 622" and hereafter referred to collectively as "Guest Software").

Each Guest OS and/or Guest Software operates as if it were running on a dedicated computer rather than a virtual machine. That is, each Guest OS and/or Guest Software may expect to control various events and have access to hardware resources on platform 600. Within each VM, the Guest OS and/or Guest Software may behave as if they were, in effect, running on platform 600's physical hardware ("Host Hardware 640", which may include a network controller 660).

It will be readily apparent to those of ordinary skill in the art that a physical hardware partition with a dedicated processor such as manageability engine (ME) 130 of FIG. 1 may provide a higher level of security than a virtualized partition (as illustrated in FIG. 6), but embodiments of the invention may be practiced in either environment and/or a combination of these environments to provide varying levels of security. It will also be readily apparent to those of ordinary skill in the art that an ME, AMT or PRL platform may be implemented within a virtualized environment. For example, VM 620 may be dedicated as an ME partition on a host while VM 610 runs typical applications on the host. In this scenario, the host may or may not include multiple processors. If the host does include two processors, for example, VM 620 may be assigned the other processor while VM 610 (and other VMs on the host) may share the resources of processor 605. On the other hand, if the host includes only a single processor, the processor may serve both the VMs, but VM 620 may still be isolated from the other VMs on the host with the cooperation of VMM 630. For the purposes of simplicity, embodiments of the invention are described in a manageability engine (ME) environment, but embodiments of the invention are not so limited. Instead, any reference to manageability engine, ME, a "partition", "a secure partition", a "security partition" and/or a "management partition" shall include any physical and/or virtual partition (as described above).

The present invention provides tamper detection and protection using chipset firmware and hardware mechanisms. Consequently, tamper detection and protection is provided automatically with no software installation needed. The tamper protection service described herein is host operating system-independent and can be configured to interoperate with a number of file systems and storage technologies used by the host system. By configuring chipset firmware to communicate with a remote tamper protection service via a secure out-of-band communication channel, service providers are protected against communication occurring with Botnet agents or other malicious agent installed on the host system.

Embodiments of the mechanisms disclosed herein may be implemented in hardware, software, firmware, or a combination of such implementation approaches. Embodiments of the invention may be implemented as computer programs executing on programmable systems comprising at least one processor, a data storage system (including volatile and non-volatile memory and/or storage elements), at least one input device, and at least one output device.

Program code may be applied to input data to perform the functions described herein and generate output information. Embodiments of the invention also include machine-accessible media containing instructions for performing the operations of the invention or containing design data, such as HDL, which defines structures, circuits, apparatuses, processors and/or system features described herein. Such embodiments may also be referred to as program products.

Such machine-accessible storage media may include, without limitation, tangible arrangements of particles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash programmable memories (FLASH), electrically erasable programmable read-only memories (EEPROMs), magnetic or optical cards, or any other type of media suitable for storing electronic instructions.

The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the mechanisms described herein are not limited in scope to any particular programming language. In any case, the language may be a compiled or interpreted language.

Presented herein are embodiments of methods and systems for handling input/output services for mass storage devices using system management interrupts. While particular embodiments of the present invention have been shown and described, it will be obvious to those skilled in the art that numerous changes, variations and modifications can be made without departing from the scope of the appended claims. Accordingly, one of skill in the art will recognize that changes and modifications can be made without departing from the present invention in its broader aspects. The appended claims are to encompass within their scope all such changes, variations, and modifications that fall within the true scope and spirit of the present invention.

What is claimed is:

1. A method comprising:
performing the following in a secure partition of a host system, the secure partition provided by firmware of a chipset of the host system, wherein the secure partition is isolated from a host operating system of the host system:
obtaining file metadata for a plurality of files stored on a device coupled to the host system;
using the file metadata to identify a first file of the plurality of files for examination for tampering;
obtaining data blocks for the first file;
communicating with a service via an out-of-band communication channel, wherein the out-of-band communication channel comprises a secure communication channel between the chipset of the host system and an enterprise service that manages the host system as one of a plurality of managed host systems;
using information obtained from the service and the data blocks to determine whether the first file has been corrupted, including constructing a reconstructed version of the first file from the data blocks; and determining whether the first file is corrupted using the reconstructed version of the first file.

2. The method of claim 1, wherein
the obtaining the file metadata and the obtaining the data blocks for the first file are performed without invoking an operating system or file system of the host system.

3. The method of claim 1 wherein
the obtaining the file metadata is performed in response to a first request from the service; and
the obtaining the data blocks is performed in response to a second request from the service.

4. The method of claim 1, wherein if the first file is corrupted, the method further comprising:
receiving a verified version of the first file from the service via the out-of-band communication channel; and
causing the first file to be replaced on the host system with the verified version of the first file.

5. The method of claim 1 wherein
the constructing and the determining are performed by a tamper protection module of the chipset.

6. The method of claim 1 wherein
the constructing and the determining are performed by the service after receiving the data blocks via the out-of-band communication channel.

7. The method of claim 1 wherein
the information obtained from the service comprises a signature for the first file; and
determining whether the first file has been corrupted comprises calculating a second signature from the data blocks for the first file and comparing the second signature to the signature for the first file.

8. The method of claim 1 further comprising:
restricting functionality of the host system in response to determining that the first file has been corrupted.

9. A system comprising:
a secure partition comprising at least one processor, the secure partition provided by firmware of a chipset of the host system, wherein the secure partition is isolated from a host operating system of the system; and
a memory comprising instructions to execute on the at least one processor in the secure partition, wherein the instructions perform the following:
obtaining file metadata for a plurality of files stored on a device coupled to the system;
using the file metadata to identify a first file of the plurality of files for examination for tampering;
obtaining data blocks for the first file;
communicating with a service via an out-of-band communication channel, wherein the out-of-band communication channel comprises a secure communication channel between the chipset of the host system and an enterprise service that manages the host system as one of a plurality of managed host systems;
using information obtained from the service and the data blocks to determine whether the first file has been corrupted, including constructing a reconstructed version of the first file from the data blocks; and determining whether the first file is corrupted using the reconstructed version of the first file.

10. The system of claim 9, wherein
the obtaining the file metadata and the obtaining the data blocks for the first file are performed without invoking the operating system or a file system of the system.

11. The system of claim 9 wherein
the obtaining the file metadata is performed in response to a first request from the service; and
the obtaining the data blocks is performed in response to a second request from the service.

12. The system of claim 9, wherein if the first file is corrupted, the instructions further perform the following:
receiving a verified version of the first file from the service via the out-of-band communication channel; and
causing the first file to be replaced on the system with the verified version of the first file.

13. The system of claim 9 wherein
the constructing and the determining are performed by a tamper protection module of the chipset.

14. The system of claim 9 wherein
the constructing and the determining are performed by the service after receiving the data blocks via the out-of-band communication channel.

15. The system of claim 9 wherein
the information obtained from the service comprises a signature for the first file; and determining whether the first file has been corrupted comprises calculating a second signature from the data blocks for the first file and comparing the second signature to the signature for the first file.

16. The system of claim 9 wherein the instructions further perform the following:
restricting functionality of the host system in response to determining that the first file has been corrupted.

17. A computer program product comprising:
a non-transitory computer-readable storage medium; and
instructions in the computer-readable storage medium, wherein the instructions, when executed on at least one processor in a secure partition of a processing system, the secure partition provided by firmware of a chipset of the host system, the secure partition being isolated from a host operating system of the processing system, perform the following:
obtaining file metadata for a plurality of files stored on a device coupled to the processing system;
using the file metadata to identify a first file of the plurality of files for examination for tampering;
obtaining data blocks for the first file;
communicating with a service via an out-of-band communication channel, wherein the out-of-band communication channel comprises a secure communication channel between the chipset of the host system and an enterprise service that manages the host system as one of a plurality of managed host systems;
using information obtained from the service and the data blocks to determine whether the first file has been corrupted, including constructing a reconstructed version of the first file from the data blocks; and determining whether the first file is corrupted using the reconstructed version of the first file.

18. The computer program product of claim 17, wherein
the obtaining the file metadata and the obtaining the data blocks for the first file are performed without invoking the operating system or a file system of the processing system.

19. The computer program product of claim 17 wherein
the obtaining the file metadata is performed in response to a first request from the service; and
the obtaining the data blocks is performed in response to a second request from the service.

20. The computer program product of claim 17 wherein if the first file is corrupted, the instructions further perform the following:
receiving a verified version of the first file from the service via the out-of-band communication channel; and
causing the first file to be replaced on the system with the verified version of the first file.

21. The computer program product of claim 17 wherein
the constructing and the determining are performed by a tamper protection module of the chipset.

22. The computer program product of claim 17 wherein
the constructing and the determining are performed by the service after receiving the data blocks via the out-of-band communication channel.

23. The computer program product of claim 17 wherein
the information obtained from the service comprises a signature for the first file; and
determining whether the first file has been corrupted comprises calculating a second signature from the data blocks for the first file and comparing the second signature to the signature for the first file.

24. The computer program product of claim 17 wherein the instructions further perform the following:
restricting functionality of the host system in response to determining that the first file has been corrupted.

* * * * *